Figures 1, 2:
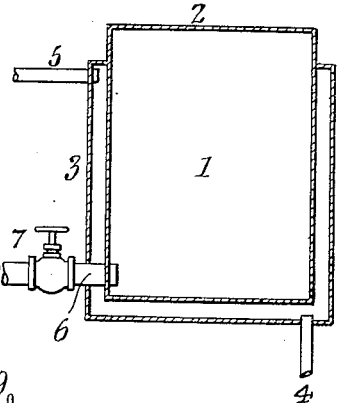

C. S. PALMER.
PROCESS OF TREATING COAL, TAR, HEAVY OILS RESULTING FROM THE DISTILLATION OF BITUMINOUS COAL, &c.
APPLICATION FILED AUG. 29, 1917.

1,360,973.

Patented Nov. 30, 1920.

Inventor:
Charles S. Palmer,
By his Attorneys
Merwin & Swemarton

UNITED STATES PATENT OFFICE.

CHARLES S. PALMER, OF PITTSBURGH, PENNSYLVANIA, ASSIGNOR TO STANDARD OIL COMPANY, A CORPORATION OF INDIANA.

PROCESS OF TREATING COAL, TAR, HEAVY OILS RESULTING FROM THE DISTILLATION OF BITUMINOUS COAL, &c.

1,360,973. Specification of Letters Patent. Patented Nov. 30, 1920.

Original application filed March 2, 1907, Serial No. 360,975. Divided and application filed June 12, 1916, Serial No. 103,288. Divided and this application filed August 29, 1917. Serial No. 188,708.

*To all whom it may concern:*

Be it known that I, CHARLES S. PALMER, a citizen of the United States, residing in Pittsburgh, county of Allegheny, and State of Pennsylvania, have invented certain new and useful Improvements in Processes of Treating Coal, Tar, Heavy Oils Resulting from the Distillation of Bituminous Coal, &c., of which the following is a specification.

My invention relates particularly to improvements in making various hydrocarbon compounds of the aromatic series from heavy oils and pitches resulting from the distillation of bituminous coal, and the like, which are either non-volatile, partially volatile, or volatile with difficulty.

The usual process of "cracking" or decomposing the aforementioned compounds consists in subjecting the same to a high degree of heat whereby they are partially decomposed and disintegrated into volatile compounds. These are simultaneously distilled with the result that more or less residual coke or carbonaceous residues are produced. In all instances known to this applicant the operation was carried on under extremely high temperatures, while the pressure was almost invariably at or below two atmospheres.

My process consists of a radical and fundamental series of changes which result in an equilibrium peculiar to each particular case and the nature of the compounds produced, which will naturally vary according to the material operated upon, the time, the degree of heat, and the pressure applied thereto.

The basis of my invention resides in the fact that other things being equal, non-volatile materials will undergo radical changes in making volatile products, the more volatile ones requiring the higher pressure, provided, sufficient heat is added to satisfy the various chemical and physical requirements.

The important features of my process consist: (1) In the complete separation of the decomposition and recomposition step from the step of distilling, the former being carried out at high pressure, usually in excess of four atmospheres, while the latter is conducted preferably at or below atmospheric pressure. (2) In conducting the decomposition and recomposition step in heavily constructed digesters capable of withstanding enormous pressures, while supplying sufficient heat thereto to liquefy, to volatilize, to create a predetermined pressure, to furnish latent heat of volatilization, and to furnish the requisite endothermic heat of formation. (3) In utilizing the pressure element to direct and control the reaction. Quite contrary to usual expectations, the greater the pressure the greater will be the decomposition, recomposition and polymerization into volatile products, which are formed in spite of pressure and work with and intensify the pressure. The pressure is controlled in each case by the equilibrium established and varies according to the materials treated, the resulting product, and the factors of heat, and time of action. (4) In the time of action, which usually after the preliminary melting and heating is a matter of only a few minutes, although in some cases special reactions may require a greater lapse of time according to the end in view.

In carrying out the said process in accordance with my invention, the materials to be treated, such as tar oils, tar pitch and the like, after a preliminary heating, if desired, to melt and render the same fluid, are introduced into a high pressure digester wherein it is subjected to the requisite conditions of temperature and pressure necessary for carrying out the process, the means for producing the requisite temperatures and pressures, &c., being indicated in the drawings accompanying this specification and forming a part thereof.

In the drawings, Figure 1 is an elevation chiefly in section of an apparatus adapted for this purpose. Fig. 2 represents a curve illustrating the process in operation.

Referring to the drawings, the reference numeral 1 designates a tank or reservoir provided with a cover 2, a steam-jacket 3, a drainage pipe 4, and a steam inlet pipe 5. An outlet pipe 6, provided with a valve 7, is connected by a pipe 8, provided with a valve 9, with a digester 10. The digester, which is constructed preferably of half-inch steel, is provided with a cap or closure 11, securely packed in the usual manner, a manhole 12, and pipe-extensions 13, 14, and 21 respectively. A jacket 15 preferably as shown being provided with steam coils 16, completely surrounds the said digester, openings being provided in both the digester and the said jacket for the insertion of a pressure-gage 17 and a thermometer 18. The pipe-extensions 14 and 21 project through the jacket 15 and are provided with a check valve 19 and a stop-cock 20 respectively. These extensions are connected with piping 22 and 23 to a still 24, of well known construction, provided with the usual steam-coils 25, inlet 26, vapor outlet 27, and thermometer 28.

During treatment, which usually is completed within a few minutes, the pressures gradually increased with the temperature, according to the curve shown in Fig. 2, until a pressure of 130 pounds was reached, when there was apparently a sudden conversion of the materials present into more volatile compounds which caused a rapid increase in the pressures as shown without the indication of any great increase in temperatures. Since the heat was being uniformly applied thereto, it is apparent that at this pressure there was a large absorption of heat which prevented any noticeable indication of an increase in temperature. While in the specific example above given the pressures constantly increase throughout the operation, it is obvious that in many instances it may be desirable to vary the pressure and subject the material to an alternating high and low pressure. To accomplish this purpose or to prevent an excessive increase in pressure, I provide the check-valve 19, which may be adjusted for any degree of pressure desired, whence upon an increase of the pressure above that to which the valve is set, the vapors from the digester will pass over into the still 24.

While steam coils are preferably utilized owing to the accuracy with which the temperature can be adjusted, especially when super-heated steam is used, as is the case when operating as above described, it is obvious that without departing from the spirit of my invention the digester may be subjected to the direct or indirect action of gases from a regenerator, muffle or other furnace.

Up to 100° C., about 5% distillate;
Between 100° C. and 150° C. about 10% to 20% distillate;
Between 150° C. and 200° C. about 10% to 20% distillate;
Between 200° C. and 250° C. about 20% to 30% distillate;
Between 250° C. and 300° C. about 10% distillate.

Thus where the materials treated had been previously non-volatile below 300° C., they uniformly, after treatment, yielded from 65% to 75% of volatile matters at temperatures varying from 100° C. to 300° C. Moreover, when the residues of one treatment were mixed with the residues of another batch or treatment and were again treated, there was no accumulation of non-volatile residue. In fact a non-volatile residue remaining from the last fraction of one treatment even if subsequently treated alone, would often be decomposed in a manner substantially similar to that of untreated residues when treated alone, since each treatment would have its quota of undecomposed residue according to the equilibrium established. Accordingly, each residue when retreated would decompose exactly as though it had not been previously treated, as the decomposition takes place at the appropriate equilibrium and long before all the residue is transformed.

In Fig. 2 the curve shown illustrates the process when operating up to 300° C. and the pressures ranging from 30 pounds up to 160 pounds, and in fact experiments show, that when operating even up to 400 pounds, the decomposition, recomposition and polymerization, other things being equal, is directly dependent upon the increase of pressure, and that the radical transformation into many new compounds having new molecular arrangements, does not begin much below five or six atmospheres independent of the temperature. On the other hand, the said experiments indicate that at pressures ranging from 20 to 30 atmospheres the formation of new compounds takes place with great rapidity. In all cases the volatile products of decomposition increase with more pressure at temperatures from 200° C. to 300° C. This indicates it is not merely the high temperatures, but rather moderate temperature and high pressure that govern the decomposition and determine the result.

The influence of the present process upon the lighter tar oils may be illustrated by this specific action when applied to heavy, tarry or pitchy materials normally substantially non-volatile about 300°C. Thus when such tarry or pitchy residues are acted upon at temperatures ranging from 200°C. to 325°C. and under pressures of from 60 to 90 pounds, but a relatively small percentage approximating from 25% to 35% of volatile products were obtained. With temperatures from 200° up to 325°C. and pressures ranging from 100 to 150 pounds to the square inch, a large percentage of the originally non-volatile material treated was transformed into volatile compounds, the percentage ranging from 50% to 75% of the original. At pressures ranging from 150 pounds up to 300 and 400 pounds per square inch, and at temperatures of from 200° to 325° C., from 75% to 90% of the materials were converted into volatile products. These products were in all cases subjected to distillation, at or below atmospheric pressure, separately from the digesting operation.

While the external pressure is not so effective as the temperature in determining the equilibrium in cases where there is no change in the number and nature of the molecules, yet in such cases as herein described, and usually at temperatures apparently approximating critical temperature, the external pressure appears to be the efficient factor in determining the character of the resulting compounds.

The results will vary according to the chemical composition of the material treated, and the products of decomposition that are possible, but always the reaction will be understood to take place according to the rule that, (given heat enough to liquefy, heat sufficient to volatilize, heat sufficient to produce the desired pressure, and sufficient heat in addition to furnish the endothermic intermolecular heat required for the various new so-called possibilities) the greater the pressure, the larger the percentage of volatile products. In this connection the difference between the true and the apparent volume, and between the true and apparent pressure serves in part to explain the unusual results and to prevent confusion.

It is understood that without departing from my process as herein specifically described the digesting operation can be alternately subjected to a relatively high and then a low pressure during the continuous application of heat to the substance being treated. In this manner without removing the materials from the digester I am enabled to carry out in a single process the complete decomposition in so far as the equilibrium permits of complete decomposition, without stopping the process, and thus in many cases the said process is rendered more efficient and economical.

Throughout the claims the term "aromatic" as used, includes not only benzene, toluene, naphthalene, anthracene etc., pyridin, quinolin &c., but also the cyclic and hydrobenzenes, including naphthenes and poly-methylenes, the hydrobenzenes referred to being such compounds as $C_6H_6H_2$, $C_6H_6H_4$, and $C_6H_6H_6$.

This application is filed as a division of my copending application No. 103,288, filed June 12, 1916, abandoned in view of the filing of this and other divisions thereof. Said abandoned application No. 103,288 was in turn filed as a division of an original application No. 360975, filed March 2nd, 1907, Patent No. 1,187,380 of June 13th, 1916.

Having thus described my invention what I claim and desire to secure by Letters Patent is:—

1. The process of treating heavy oils resulting from the distillation of bituminous coal to increase the yield of volatile compounds above that normally obtainable therefrom, which consists in digesting the same in a confined space under a pressure in excess of four atmospheres, said pressure being principally autogenous, and at a temperature in excess of 200° C., for a time sufficiently long to induce transformation of the major portion of said materials treated into more volatile products, said temperature being below that point at which sufficient carbonization occurs to substantially interfere with such transformation, and said digesting being conducted with the treated materials being continually subjected to the pressure throughout said digesting period of the evolved volatilized compounds undiluted by added aqueous vapors.

2. The process of treating tar to increase the yield of volatile compounds above that normally obtainable therefrom, which consists in digesting the same in a confined space under a pressure in excess of four atmospheres, said pressure being principally autogenous, and at a temperature in excess of 200° C., for a time sufficiently long to induce transformation of the major portion of said materials treated into more volatile products, said temperatures being below that point at which sufficient carbonization occurs to substantially interfere with such transformation, and said digesting being conducted with the treated materials being continually subjected to the pressure throughout the said digesting period of the evolved volatilized compounds undiluted by added aqueous vapors.

3. The process of treating heavy oils resulting from the distillation of bituminous coal to increase the yield of volatile compounds above that normally obtainable therefrom, which consists in digesting the same in a confined space under a pressure in excess of four atmospheres and not exceeding 400 pounds per square inch, said pressure being principally autogenous, and at a temperature in excess of 200° C., for a time sufficiently long to induce transformation of the major portion of said materials treated into more volatile products, said temperature being below that point at which sufficient carbonization occurs to substantially interfere with such transformation, and said digesting being conducted with the treated materials being continually subjected to the pressure throughout said digesting period of the evolved volatilized compounds undiluted by added aqueous vapors.

4. The process of treating coal-tar oil and residues thereof, to increase the yield of volatile compounds above that normally obtainable therefrom, which consists in digesting the same in a confined space under a pressure in excess of four atmospheres, said pressure being principally self-produced by the evolved volatilized compounds undiluted by added aqueous vapors, and at a temperature in excess of 200° C., for a time sufficiently long to induce transformation of the major portion of said materials treated into more volatile products, said temperatures being below that point at which sufficient carbonization occurs to substantially interfere with such transformation, and said digesting being conducted with the treated materials.

In witness whereof I have hereunto set my hand at the city of Pittsburgh, county of Allegheny and State of Penn., this 27th day of August, 1917.

CHARLES S. PALMER.